April 5, 1932. H. T. SEELEY 1,852,825
METHOD AND APPARATUS FOR SYNCHRONIZING
ALTERNATING CURRENT GENERATORS
Filed July 15, 1929
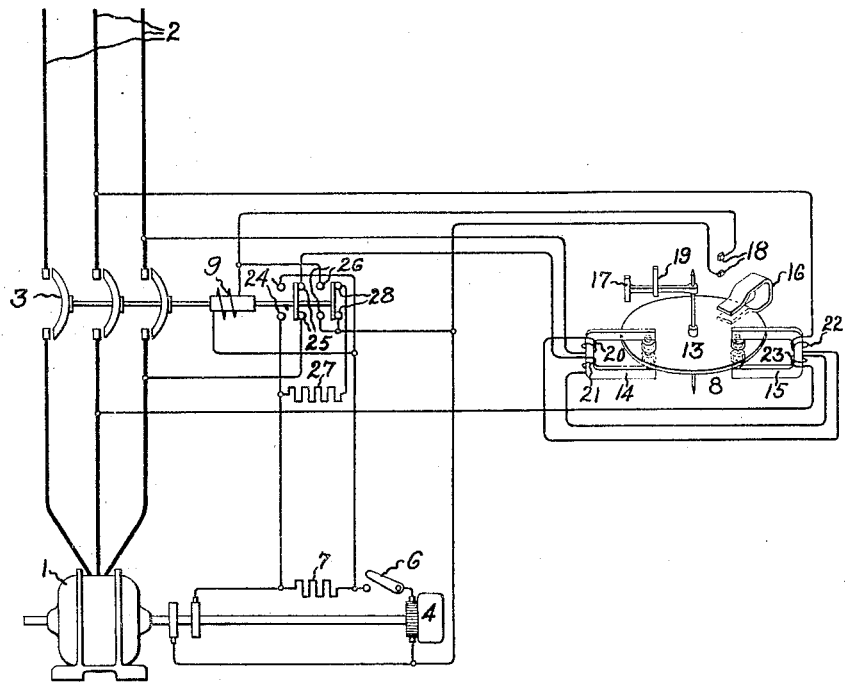
Inventor:
Harold T. Seeley,
by Charles E. Tullar
His Attorney.

Patented Apr. 5, 1932

1,852,825

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

METHOD AND APPARATUS FOR SYNCHRONIZING ALTERNATING CURRENT GENERATORS

Application filed July 15, 1929. Serial No. 378,317.

My invention relates to methods and arrangements of apparatus for synchronizing alternating current generators and its object is to provide an improved method and an improved arrangement of apparatus for accomplishing this result.

The method of self-synchronizing an alternating current generator now in general use in automatic stations consists in connecting the generator unexcited to the alternating current system when the generator speed is above a predetermined value and then exciting the generator field winding with direct current. Such a method of self-synchronizing has the undesirable feature of effecting the synchronizing at different percentages of the system frequency if the system frequency is variable. Also such a method is apt to effect a late synchronizing if the control voltage, which is usually the exciter voltage, becomes available to close the circuit breaker between the generator and the system after the generator speed has exceeded a predetermined value during the starting operation. Furthermore, in order to insure self-synchronizing of the generator with such a method, it has been considered necessary to provide the generator with a short-circuited winding.

In accordance with my invention, I provide an improved method and arrangement of apparatus for self-synchronizing a generator whereby the above-mentioned undesirable features and the necessity of using a short-circuited winding on the generator are eliminated. I provide an arrangement whereby the self-synchronizing can take place only when there is less than a predetermined speed difference between the generator and the system.

My invention will be better understood from the following description when taken in connection with the accompanying drawing which shows diagrammatically an automatic synchronizing arrangement embodying my invention and its scope will be pointed out in the appended claims.

Referring to the drawing, 1 represents a polyphase generator which is adapted to be connected to a polyphase circuit 2 by means of a circuit breaker 3 which may be of any suitable type, examples of which are well known in the art. The generator 1 may be driven by any suitable type of prime mover (not shown).

For controlling the excitation of the generator 1, a suitable source of direct current, such as an exciter 4 direct connected to the generator 1, is provided. The field winding of the generator 1 is arranged to be connected to the terminals of the exciter 4 by means of a suitable control switch 6 which may be either manually or automatically operated, as desired. In accordance with my invention, the amount of direct current supplied to the generator field winding when the switch 6 is closed and the circuit breaker 3 is open is only just sufficient to produce a voltage across the generator terminals which is reasonably free from variations in magnitude, due to previous magnetizations of the generator field and is not sufficient to pull the generator into synchronism when the generator is connected to the circuit 2. This voltage usually is approximately 5 to 10% of the normal voltage of the generator. In the arrangement shown, this result is obtained by connecting suitable current limiting means, such as a resistor 7, in series with the exciter and the generator field winding so that the winding current of the generator is limited to the desired value.

For effecting the closing of the circuit breaker 3 in response to a predetermined speed difference between the generator 1 and the circuit 2, I provide suitable synchronizing means 8, examples of which are well known in the art for completing an energizing circuit for the closing coil 9 of the circuit breaker 3 when the frequency and difference between the voltages of the generator 1 and the circuit 2 is below a predetermined value and the phase difference is between predetermined values. The particular synchronizing means 8 shown in the drawing comprises an induction disk 13 which has opposing torques exerted thereon by the shaded pole motor elements 14 and 15. Suitable means such as a drag magnet 16 is provided to exert a retarding force on the disk 13 so that the desired time delay action in the movement of the disk may be obtained. Attached to the disk 13 is a contact member 17 which is arranged to be moved into engagement with stationary contacts 18 when the torque of the motor element 14 exceeds the torque of the motor element 15. When the torque of the motor element 15 exceeds the torque of the motor element 14 the contact member 17 is arranged to be moved into engagement with a stop 19.

The motor element 14 is arranged to be energized by the windings 20 and 21 which are respectively energized in response to the voltages of the circuit 2 and the generator 1 and which are so arranged that a torque is exerted on the disk 13 in accordance with the vector sum of two voltages, one from the generator 1 and the other from the circuit 2, and in a direction to move the contact member 17 into engagement with the contacts 18. The motor element 15 is arranged to be energized by the windings 22 and 23 which are respectively energized in response to the same two voltages and which are so arranged that a torque is exerted on the disk 13 in accordance with the vector difference between these two voltages and in a direction to move the contact member 17 away from the contacts 18. The motor elements 14 and 15 are also constructed so that the torque exerted by the motor element 14 exceeds the torque exerted by the motor element 15 only when the phase difference between these two voltages is less than a predetermined value. Therefore, due to the retarding effect exerted by the drag magnet 16 it will be observed that only when the frequency difference between the voltages of the generator 1 and the circuit 2 is less than a predetermined value will the torque exerted by the motor element 14 exceed the torque exerted by the motor element 15 for a sufficient length of time to move the contact member 17 into engagement with the contacts 18.

After the circuit breaker 3 is closed to connect the generator 1 to the circuit 2, it is then desirable to increase the excitation of the generator 1 to its normal value. In the embodiment of my invention shown in the drawing this result is obtained by providing the circuit breaker 3 with the auxiliary contacts 24 which short-circuit the resistor 7 in the field circuit of the generator 1 when the circuit breaker 3 is closed.

Since the windings 21 and 23 of the synchronizing device 8 are connected so that they respond to the relatively low voltage of the generator 1 prior to the closing of the circuit breaker 3, it is necessary to protect these windings against the relatively high voltage which would be impressed across them in response to the closing of the circuit breaker 3. In the embodiment shown in the drawing, I accomplish this protection by connecting the auxiliary contacts 25 of the circuit breaker 3 in the energizing circuits of the windings 21 and 23 so that energizing circuits of both of these windings are opened when the circuit breaker 3 closes. In order to maintain the closing coil 9 of the circuit breaker 3 energized independently of the contacts 18 of the synchronizing device 8 after the circuit breaker 3 closes, the circuit breaker 3 by closing its auxiliary contacts 26 completes a holding circuit for the closing coil 9.

In order to prevent the voltage induced in the generator field winding in response to the closing of the circuit breaker 3, from rising to a dangerous value, I provide a resistor 27 which is arranged to be connected in shunt across the exciter terminals by auxiliary contacts 28 on the circuit breaker 3 when it is open.

The operation of the arrangement shown in the drawing is as follows: When it is desired to place the generator 1 in operation, the generator is first brought up to approximately snychronous speed by controlling the speed of the prime mover which drives the generator. The field switch 6 is then closed. Due to the resistor 7 in the field circuit of the generator only sufficient direct current flows through the generator field winding to produce a generator voltage of approximately 5 to 10% of the normal generator voltage. When the generator voltage builds up to its predetermined subnormal value and the desired frequency and phase relation occurs between the subnormal voltage of the generator 1 and the voltage of the circuit 2, the synchronizing device 8 closes its contacts 18 and connects the closing coil 9 of the circuit breaker 3 across the exciter 4 so that the generator 1 with its subnormal excitation is connected across the circuit 2 but the excitation of the generator is not sufficient to pull it into synchronism. The circuit breaker 3 by closing its contacts 26 completes a locking circuit for the closing coil 9 and by opening its contacts 25 disconnects the low voltage windings 20 and 22 of the synchronizing device 8 from across the terminals of the generator 1. As soon as the circuit breaker 3 closes its auxiliary contacts 24 and thereby short-circuits the resistor 7, the excitation of the generator 1 builds up to its normal value so that the generator is pulled into synchronism with the circuit 1 and then is in condition to supply current thereto.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. The step in the method of synchronizing an alternating current generator with an electric system which consists in applying an excitation to the generator sufficient to give a generated voltage reasonably free from variations in magnitude due to previous magnetizations of the generator but not sufficient to pull the generator into synchronism and then while maintaining said subnormal excitation connecting the generator to the system when the speed difference between generator and the synchronous speed of the system is less than a predetermined value and a predetermined phase relation exists between the voltages of said generator and said system.

2. The method of synchronizing an alternating current generator with an electric system which consists in applying an excitation to the generator just sufficient to give a generator voltage reasonably free from variations in magnitude due to previous magnetizations of the generator and then while maintaining said subnormal excitation connecting the generator to the system and increasing the generator excitation when the difference between the frequencies of the generator and the system is less than a predetermined value and a predetermined phase relation exists between the voltages of said generator and said system.

3. The method of synchronizing an alternating current generator with an alternating current system which consists in operating the generator at approximately its synchronous speed and with an excitation only sufficient to give a relatively low subnormal generator voltage reasonably free from variations in magnitude due to previous magnetizations of the generator, then connecting the generator with said subnormal excitation to the circuit in accordance with a predetermined relation between the speed of said generator and the frequency of said circuit, and then increasing the generator excitation.

4. The method of synchronizing a synchronous generator with an alternating current system which consists in connecting said generator to said circuit at a time when the direct current flowing through the field circuit of said generator is sufficient only to give a relatively low subnormal generator voltage reasonably free from variations in magnitude due to previous magnetizations of the generator, and then increasing the excitation.

5. The method of synchronizing a synchronous generator with an alternating current system which consists in connecting said generator to said circuit at a time when the direct current flowing through the field circuit of said generator is sufficient only to give a relatively low subnormal generator voltage reasonably free from variations in magnitude due to previous magnetizations of the generator and a predetermined relation exists between the voltages of said generator and system and between the frequencies of said generator and system.

6. The step in the method of synchronizing an alternating current generator with an electric system which consists in applying an excitation to the generator to give a generated voltage of approximately 5 to 10% of normal, and then connecting the generator to the system when the frequency difference between the subnormally excited generator and the system is less than a predetermined value and a predetermined phase relation exists between the voltages of said generator and said system.

7. The method of synchronizing an alternating current generator with an electric system which consists in applying an excitation to the generator to give a generated voltage of approximately 5 to 10% of normal, and then connecting the generator to the system and increasing the excitation of the generator when the frequency difference between the generator and the system is less than a predetermined value and a predetermined phase relation exists between the voltages of said generator and said system.

8. In an arrangement for synchronizing an alternating current generator with an alternating current system, the combination of means for supplying said generator with an excitation just sufficient to give a subnormal voltage reasonably free from variations in magnitude due to previous magnetizations of the generator, and means dependent upon the phase relation between said subnormal voltage of the generator and the voltage of the system for connecting the generator to the system.

9. In an arrangement for synchronizing an alternating current generator with an alternating current system, the combination of means for supplying said generator with an excitation just sufficient to give a subnormal voltage reasonably free from variations in magnitude due to previous magnetizations of the generator, and means controlled in accordance with the relative frequencies of the subnormal voltage of said generator and the voltage of said system for connecting said generator to said system.

10. In an arrangement for synchronizing an alternating current generator with an alternating current system, the combination of means for supplying said generator with an excitation just sufficient to give a subnormal voltage reasonably free from variations in magnitude due to previous magnetizations of the generator, and means controlled in accordance with the relative frequencies of the subnormal voltage of said generator and the voltage of said system for connecting said generator to said system and for increasing the excitation of said generator.

11. In an arrangement for synchronizing an alternating current generator with an alternating current system, the combination of means for supplying said generator with an excitation just sufficient to give a subnormal voltage reasonably free from variations in magnitude due to previous magnetizations of the generator, and means including an electroresponsive device having a winding energized in accordance with the voltage of said generator for effecting the connection of said generator to said system and the deenergization of said winding.

12. In an arrangement for synchronizing an alternating current generator with an alternating current system, the combination of means for supplying said generator with an excitation just sufficient to give a subnormal voltage reasonably free from variations in magnitude due to previous magnetizations of the generator, a circuit breaker for connecting said generator to said system, means controlled in accordance with the relative frequencies of the subnormal voltage of said generator and the voltage of said system for effecting the closing of said circuit breaker, and means for effecting an increase in the excitation of said generator when said circuit breaker closes.

13. In an arrangement for synchronizing an alternating current generator with an alternating current system, the combination of means for supplying said generator with an excitation just sufficient to give a subnormal voltage reasonably free from variations in magnitude due to previous magnetizations of the generator, a circuit breaker for connecting said generator to said system, means including an electroresponsive device having a winding connected to said generator for effecting the closing of said circuit breaker in accordance with the relative phases of the voltages of said generator and system, and means for disconnecting said winding from said generator when said circuit breaker is closed.

14. In an arrangement for synchronizing an alternating current generator with an alternating current system, the combination of means for supplying said generator with an excitation just sufficient to give a subnormal voltage reasonably free from variations in magnitude due to previous magnetizations of the generator, a circuit breaker for connecting said generator to said system, means including an electroresponsive device having a winding connected to said generator for effecting the closing of said circuit breaker in accordance with the relative phases of the voltages of said generator and system, and means for disconnecting said winding from said generator and for effecting an increase in the excitation of said generator when said circuit breaker is closed.

15. In combination, an electric circuit, a synchronous generator excited so that the voltage thereof is substantially 5 to 10% of its normal voltage, and means controlled by the phase relation between said subnormal voltage of said generator and the voltage of said circuit for connecting said generator to said circuit.

16. In combination, an electric circuit, a synchronous generator excited so that the voltage thereof is substantially 5 to 10% of its normal voltage, and means controlled by the phase relation between said subnormal voltage of said generator and the voltage of said circuit for connecting said generator to said circuit and for increasing the excitation of said generator.

In witness whereof, I have hereunto set my hand this 11th day of July, 1929.

HAROLD T. SEELEY.